United States Patent [19]

Moore

[11] Patent Number: 5,595,014
[45] Date of Patent: Jan. 21, 1997

[54] FISHING ROD TIE

[76] Inventor: Clifton H. Moore, 4901 49th Ave., Hyattsville, Md. 20781

[21] Appl. No.: 391,512

[22] Filed: Feb. 21, 1995

[51] Int. Cl.⁶ .................................................... A01K 87/00
[52] U.S. Cl. .................. 43/25; 24/304; 24/306; 43/54.1
[58] Field of Search ............................ 43/21.2, 25, 54.1; 128/DIG. 15; 24/306, 442, 304, DIG. 11

[56] References Cited

U.S. PATENT DOCUMENTS

| | | |
|---|---|---|
| D. 247,972 | 5/1978 | Ader . |
| 3,425,150 | 2/1969 | Braese . |
| 3,992,799 | 11/1976 | Oakes . |
| 3,994,048 | 11/1976 | Rosenthal ................................ 24/306 |
| 4,074,397 | 2/1978 | Rosin ..................................... 24/306 |
| 4,519,159 | 5/1985 | Fazio . |
| 4,706,914 | 11/1987 | Ground ................................... 24/306 |
| 4,759,963 | 7/1988 | Uso ........................................ 43/54.1 |
| 4,862,563 | 9/1989 | Flynn ..................................... 24/306 |
| 5,200,245 | 4/1993 | Brodrick ................................. 24/306 |
| 5,214,874 | 6/1993 | Faulkner ................................ 43/54.1 |
| 5,327,669 | 7/1994 | Lannan et al. . |

Primary Examiner—Kurt Rowan
Attorney, Agent, or Firm—Richard C. Litman

[57] ABSTRACT

A hook-and-loop fastener for holding the pieces of multi-piece fishing rods together, when the rods are being stored or transported. The fastener is in the form of a strip with a hook portion and a loop portion. An adhesive backing is provided on either the loop portion or the hook portion, whichever is shorter in length. The adhesive is used to attach the shorter portion of the fastener to the fishing rod handle and the other longer portion of the fastener is looped around the other pieces of the fishing rod to hold the bundle together.

8 Claims, 2 Drawing Sheets

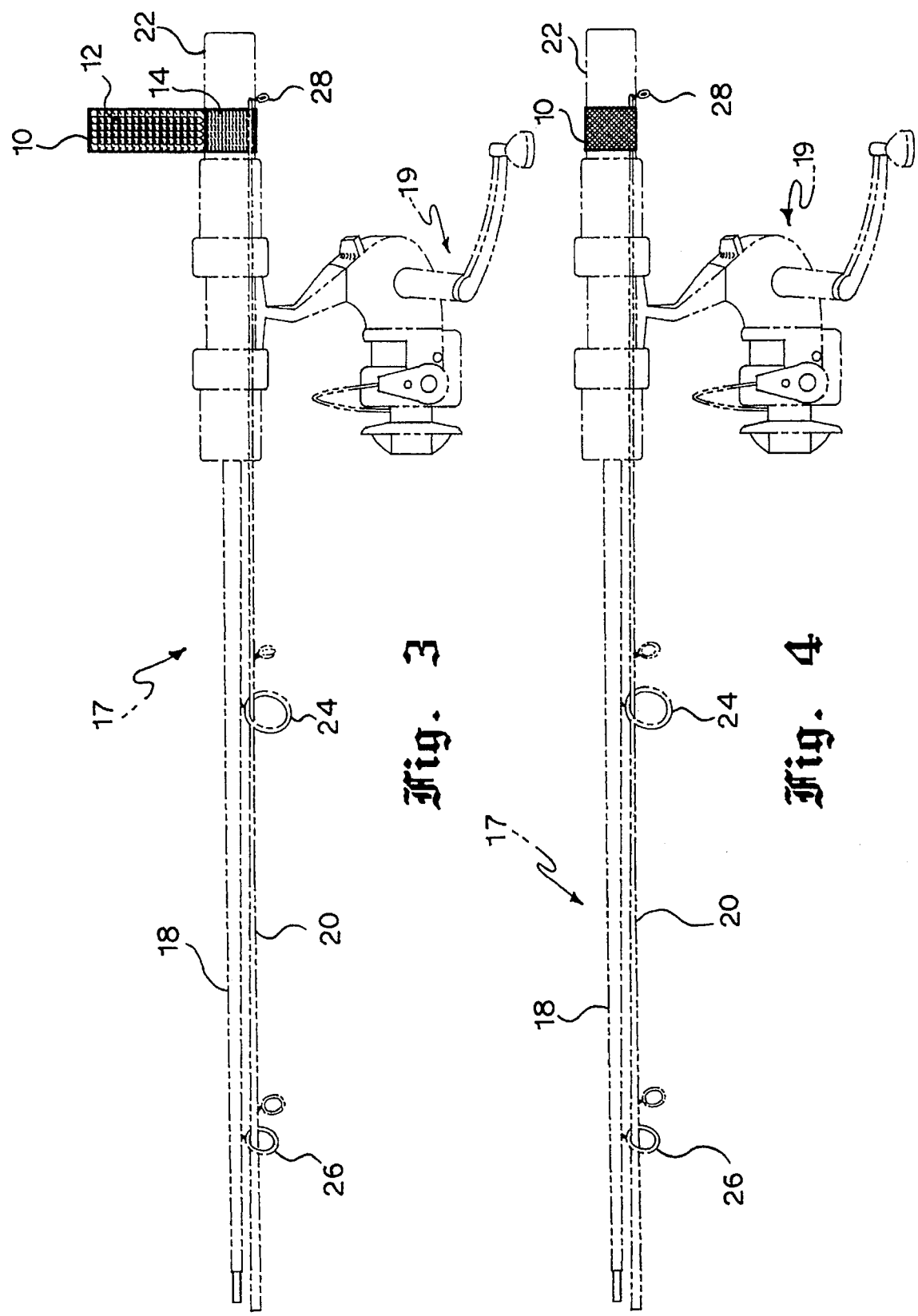

FISHING ROD TIE

BACKGROUND OF THE INVENTION

1. Field of the Invention

The present invention relates to a hook-and-loop fastener for holding the pieces of multi-piece fishing rods together, when the rods are being stored or transported.

2. Description of the Prior Art

Multi-piece fishing rods are probably the most popular type of fishing rod currently in use. These rods break down into two or more pieces making them far more convenient to carry and store than one piece rods. According to current practice, anglers use rubber bands to hold the rod pieces together to allow the rods to be more conveniently stored and carried. However, rubber bands tend to rot and break in a short time when exposed to the harsh conditions commonly encountered during fishing trips. When the rubber band breaks, the rod pieces are no longer neatly bundled together, thus making one-handed carrying of the rod extremely difficult. In addition, when the rod pieces are no longer neatly bundled together, rod pieces can be misplaced or lost and the fishing line can become knotted and tangled, thus creating a source of great frustration for the angler.

The hook-and-loop fastener of the present invention was made to address the anglers' need for a simple, inexpensive, and durable means for keeping the pieces of a multi-piece fishing rod together in a neat bundle. Other devices for organizing the pieces of a fishing rod have been proposed in the prior art, but they all suffer from unnecessary cost and complexity.

U.S. Pat. No. 5,327,669, issued to Lannan et al., shows a bag with a plurality of pockets. Each pocket can hold a fishing rod, and the bag can be rolled-up into a conveniently carried bundle.

U.S. Pat. No. 4,519,159, issued to Fazio, shows a strap with a buckle that loops around the angler's hand to aid in the holding of the rod while fishing.

U.S. Pat. No. 3,992,799, issued to Oakes, and U.S. Pat. No. 3,425,150, issued to Braese, show retaining brackets that fit the ends of the handle portion of the rod, and hold the second portion of the rod alongside the handle portion.

U.S. Pat. No. 247,972, issued to Ader, shows a collapsible fishing rod.

None of the above inventions and patents, taken either singly or in combination, is seen to describe the instant invention as claimed.

SUMMARY OF THE INVENTION

The present invention is directed to a hook-and-loop fastener for holding the pieces of multi-piece fishing rods together, when the rods are being stored or transported. The fastener is in the form of a strip with a hook portion and a loop portion. An adhesive backing is provided on either the loop portion or the hook portion. The adhesive is used to attach a portion of the fastener to the fishing rod handle and the other portion of the fastener is looped around the other pieces of the fishing rod to hold the bundle together.

Accordingly, it is a principal object of the invention to facilitate one-handed carrying of multi-piece fishing rods when broken down, leaving the other hand free for carrying a tackle box or other equipment.

It is another object of the invention to prevent the loss or misplacing of any of the pieces of the fishing rod.

It is a further object of the invention to prevent knotting and tangling of the fishing line during transportation and storage.

Still another object of the invention is to provide a fastener, for bundling pieces of a fishing rod together, which is durable under the harsh environmental conditions encountered when fishing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is an environmental view of the fastener of the present invention showing the loop portion before it is fastened to the hook portion attached to the handle of the fishing rod shown in dashed lines.

FIG. 4 is an environmental view of the fastener of the present invention showing the loop portion fastened to the hook portion attached to the handle of the fishing rod shown in dashed lines.

Similar reference characters denote corresponding features consistently throughout the attached drawings.

DETAILED DESCRIPTION OF THE PREFERRED EMBODIMENT

Figures 1, 2:
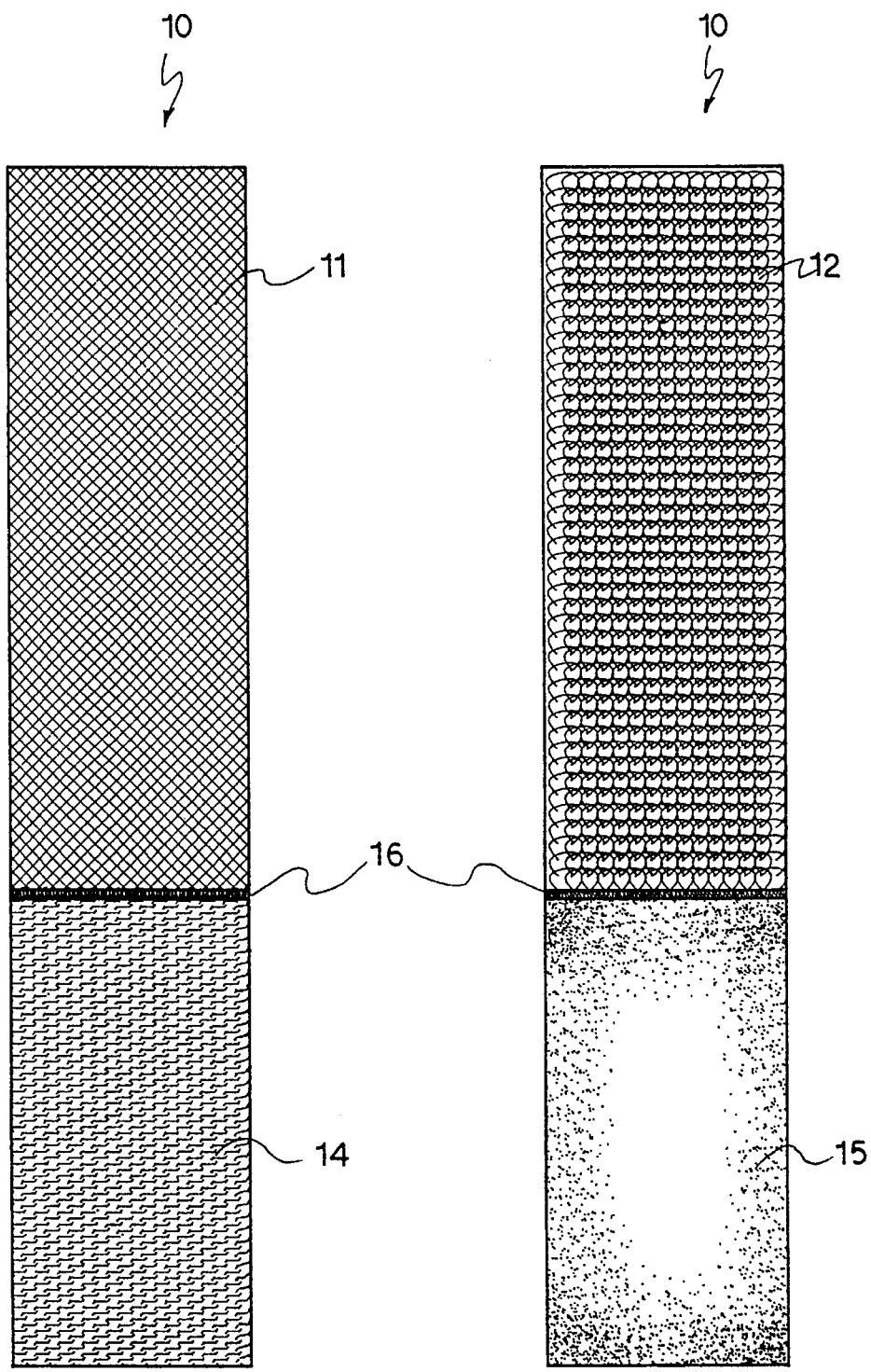
FIG. 1 is an elevational view of a first side of the fastener of the present invention.
FIG. 2 is an elevational view of a second side of the fastener of the present invention.

Referring to FIGS. 1 and 2, the present invention is a fastener or tie 10 for holding together pieces of a multi-piece fishing rod. The fastener 10 is generally in the form of a rectangular strip. The fastener 10 is preferably made of nylon webbing but may be made of any other suitable fabric.

The fastener 10 carries both the hook and the loop portions of a hook-and-loop fastening system of the VEL-CRO® type. The loop portion 12 and its smooth backside 11 of the fastener 10 carries the loops of yarn associated with the VELCRO® type fastening system. The hook portion 14 and its adhesive backing 15 carries the hooks associated with the VELCRO® type fastening system. The hook portion 14 and the loop portion 12 are most preferably made in two separate pieces and then sewn together using stitching 16. This method of manufacture allows the use of readily available components and is thus more cost effective.

Generally, one of the portions 12 and 14 is longer than the other. The shorter portion is provided with an adhesive backing 15, and is intended for attachment to the fishing rod handle. The longer portion (11 and 12) does not have an adhesive backing 15, and is intended for being wrapped around the bundle of pieces that make up the fishing rod. A peel-away, release liner (not shown) can also be provided on the adhesive backing 15 to protect the adhesive prior to the attachment of the fastener 10 to a fishing rod handle.

The portions 12 and 14 are preferably sewn together at 16 such that the hooks 14 and the loops 12 are provided on opposite sides of the strip forming the fastener 10. In the example illustrated in FIGS. 1 and 2, The loop portion 12 is longer than the hook portion 14, and the hook portion 14 is provided with the adhesive backing 15. Also, in the illustrated example, the hooks 14 and the loops 12 are shown projecting from opposite sides of the fastener 10.

The longer portion of the fastener 10 is generally rectangular in shape, and is in the range of 0.5 to 1.5 inches wide and in the range of 2.5 to 3.5 inches long. Most preferably, the longer portion of the fastener 10 is 1.0 inch wide and 3.0 inches long. The shorter, adhesive backed portion of fastener 10 is also generally rectangular in shape, and is in the range of 0.5 to 1.5 inches wide and in the range of 1.5 to 2.5 inches long. Most preferably, the adhesive backed portion of the fastener 10 is 1.0 inch wide and 2.0 inches long.

Referring to FIGS. 3 and 4, the fastener 10 is shown applied to a conventional two piece rod and reel 19 shown in dashed lines. The two-piece rod 17 includes a handle piece 18 and a tip piece 20. To apply the fastener 10, the adhesive backed portion 15 of the fastener is attached to the base of the rod handle 22, by wrapping the adhesive backed portion around the base of the handle 18 with the adhesive surface in contact with the rod handle 18. When the rod 17 is taken apart, the thick end of the tip piece 20 is passed through the large diameter eyes 24 and 26 of handle piece 18, and the rod tip 28 is rested alongside, and in contact with, the rod handle 22. The long portion of the fastener 10 is then tightly wrapped around the rod tip 28, and is fixed in place by the VELCRO® type fastening system. The two pieces 18 and 20 of the rod are thus locked together for travel and/or storage.

In the illustrated example, the long portion of fastener 10 is the loop portion 12, and the shorter adhesive backed portion is the hook portion 14.

It is to be understood that the present invention is not limited to the sole embodiment described above, but encompasses any and all embodiments within the scope of the following claims.

I claim:

1. A fastener strip for holding together pieces of a multi-piece fishing rod comprising:

an elongated hook portion having a first end, a second end and a first length, said hook portion having a plurality of hooks on a first surface thereof and an adhesive provided on a second surface thereof;

an elongated loop portion having a first end, a second end and a second length, said loop portion having a plurality of loops of yarn on a first surface thereof and a smooth backside provided on a second surface thereof, said second end of said hook portion being attached to said first end of said loop portion to form a continuous strip which is substantially the sum of the first and second lengths; and wherein said first length of said hook portion is relatively shorter than said second length of said loop portion, and said plurality of hooks are on an opposite side from said plurality of loops;

whereby said loop portion can be adhered to a fishing rod handle forming part of a first piece of multi-piece fishing rod, and said hook portion can be drawn around at least a second piece of the multi-piece fishing rod, thereby holding at least the first piece and the second piece of the multi-piece fishing rod together.

2. The fastener strip for holding together pieces of a multi-piece fishing rod according to claim 1, wherein said second end of said hook portion is attached to said first end of said loop portion by stitching.

3. The fastener strip for holding together pieces of a multi-piece fishing rod according to claim 1, wherein said loop portion is rectangular in shape and is in the ranges of 0.5 to 1.5 inches wide and 2.5 to 3.5 inches long, said hook portion is rectangular in shape and is in the ranges of 0.5 to 1.5 inches wide and 1.5 to 2.5 inches long, and said hook portion and said loop portion are equally wide.

4. The fastener strip for holding together pieces of a multi-piece fishing rod according to claim 1, wherein the fastener strip is nylon.

5. A fastener strip for holding together pieces of a multi-piece fishing rod comprising:

an elongated hook portion having a first end, a second end and a first length, said hook portion having a plurality of hooks on a first surface thereof and an adhesive provided on a second surface thereof;

an elongated loop portion having a first end, a second end and a second length, said loop portion having a plurality of loops of yarn on a first surface thereof;

said second end of said hook portion being attached to said first end of said loop portion to form a continuous strip which is substantially the sum of the first and second lengths; and wherein said first length of said hook portion is relatively shorter than said second length of said loop portion, and said plurality of hooks are on an opposite side from said plurality of loops;

whereby said hook portion can be adhered to a fishing rod handle forming part of a first piece of a multi-piece fishing rod, and said loop portion can be drawn around at least a second piece of the multi-piece fishing rod, thereby holding at least the first piece and the second piece of the multi-piece fishing rod together.

6. The fastener strip for holding together pieces of a multi-piece fishing rod according to claim 5, wherein said second end of said hook portion is attached to said first end of said loop portion by stitching.

7. The fastener strip for holding together pieces of a multi-piece fishing rod according to claim 5, wherein said loop portion is rectangular in shape and is in the ranges of 0.5 to 1.5 inches wide and 2.5 to 3.5 inches long, said hook portion is rectangular in shape and is in the ranges of 0.5 to 1.5 inches wide and 1.5 to 2.5 inches long, and said hook portion and said loop portion are equally wide.

8. The fastener strip for holding together pieces of a multi-piece fishing rod according to claim 5, wherein the fastener strip is nylon.

\* \* \* \* \*